(12) United States Patent
Shen et al.

(10) Patent No.: US 9,656,690 B2
(45) Date of Patent: May 23, 2017

(54) SYSTEM AND METHOD FOR USING GESTURES IN AUTONOMOUS PARKING

(71) Applicant: Robert Bosch GmbH, Stuttgart (DE)

(72) Inventors: Zhongnan Shen, Milpitas, CA (US); Fuliang Weng, Mountain View, CA (US); Benno Albrecht, Holzmaden (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 14/066,455

(22) Filed: Oct. 29, 2013

(65) Prior Publication Data

US 2014/0121883 A1 May 1, 2014

Related U.S. Application Data

(60) Provisional application No. 61/720,186, filed on Oct. 30, 2012.

(51) Int. Cl.
*B62D 15/02* (2006.01)

(52) U.S. Cl.
CPC .............................. *B62D 15/0285* (2013.01)

(58) Field of Classification Search
None
See application file for complete search history.

(56) References Cited

U.S. PATENT DOCUMENTS

| | | | |
|---|---|---|---|
| 6,426,708 B1 | 7/2002 | Trajkovic et al. | |
| 6,917,693 B1 * | 7/2005 | Kiridena et al. | 701/514 |
| 7,069,128 B2 * | 6/2006 | Iwama | 701/36 |
| 7,176,959 B2 | 2/2007 | Sato et al. | |
| 8,194,132 B2 | 6/2012 | Dayan et al. | |
| 2005/0049767 A1 * | 3/2005 | Endo et al. | 701/36 |
| 2006/0181792 A1 * | 8/2006 | Plaster | 359/857 |
| 2007/0100543 A1 * | 5/2007 | Kato | B62D 15/0285 701/36 |
| 2009/0085771 A1 | 4/2009 | Wu et al. | |
| 2009/0091475 A1 * | 4/2009 | Watanabe | B62D 15/028 701/41 |
| 2010/0005428 A1 | 1/2010 | Ikeda et al. | |

(Continued)

FOREIGN PATENT DOCUMENTS

GB    2481536 A    12/2011

OTHER PUBLICATIONS

Computerworld, Inc., "Nissan previews self-driving car", retrieved from the Internet, dated Oct. 3, 2012 (2 pages).

(Continued)

*Primary Examiner* — John R Olszewski
*Assistant Examiner* — David Merlino
(74) *Attorney, Agent, or Firm* — Maginot Moore & Beck LLP

(57) ABSTRACT

A method of providing parking assistance in a vehicle includes identifying with a controller in a vehicle a plurality of available parking spaces for the vehicle, generating with a video output device operatively connected to the controller an interface with a graphical depiction of the vehicle and the plurality of available parking spaces, receiving a first input gesture with a gesture input device to select one parking space from the plurality of available parking spaces, and operating the vehicle to park the vehicle in the one parking space using the controller configured with a parking assistance service in the vehicle.

18 Claims, 7 Drawing Sheets

(56) References Cited

U.S. PATENT DOCUMENTS

2011/0106426 A1   5/2011   Tertoolen
2012/0056758 A1   3/2012   Kuhlman et al.

OTHER PUBLICATIONS iDownloadBlog, "Park4U Lets You Use Your iPhone to Park Your Car Remotely", retrieved from the Internet on Oct. 17, 2013 (5 pages).
NYDailyNews.com, "Park your care with your smartphone, courtesy of Valeo's Park4U app", retrieved from the Internet, dated Sep. 15, 2011 (3 pages).
International Search Report and Written Opinion corresponding to PCT Application No. PCT/US2013/067501, mailed Apr. 24, 2014 (8 pages).

* cited by examiner

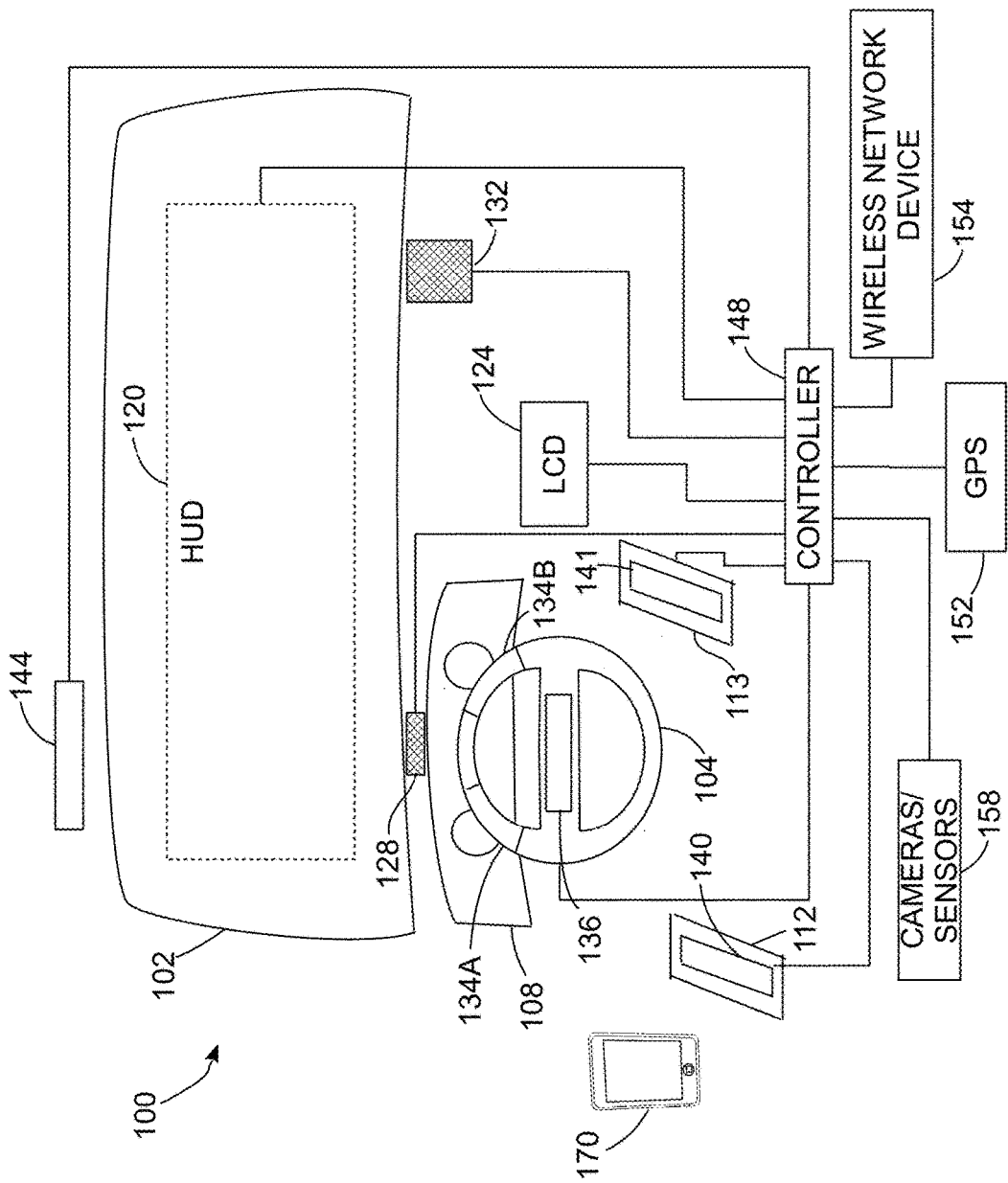

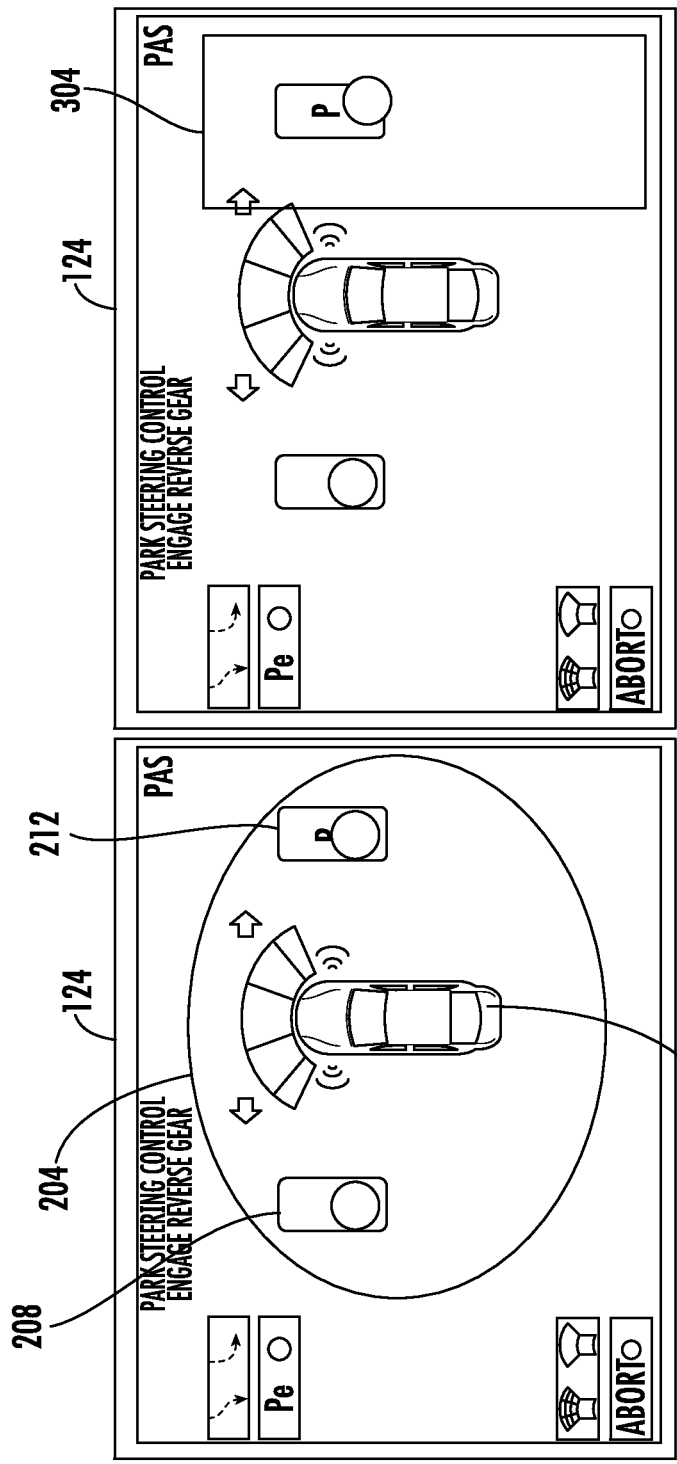

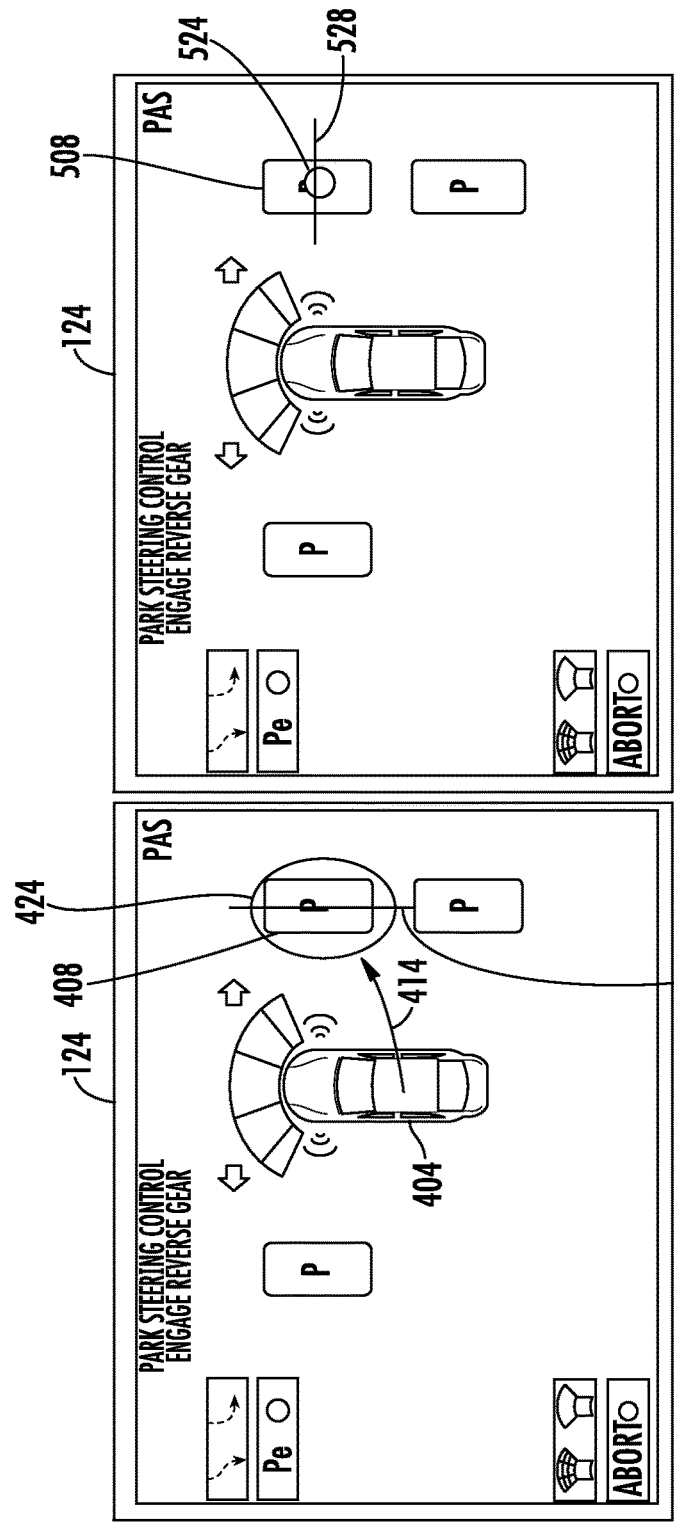

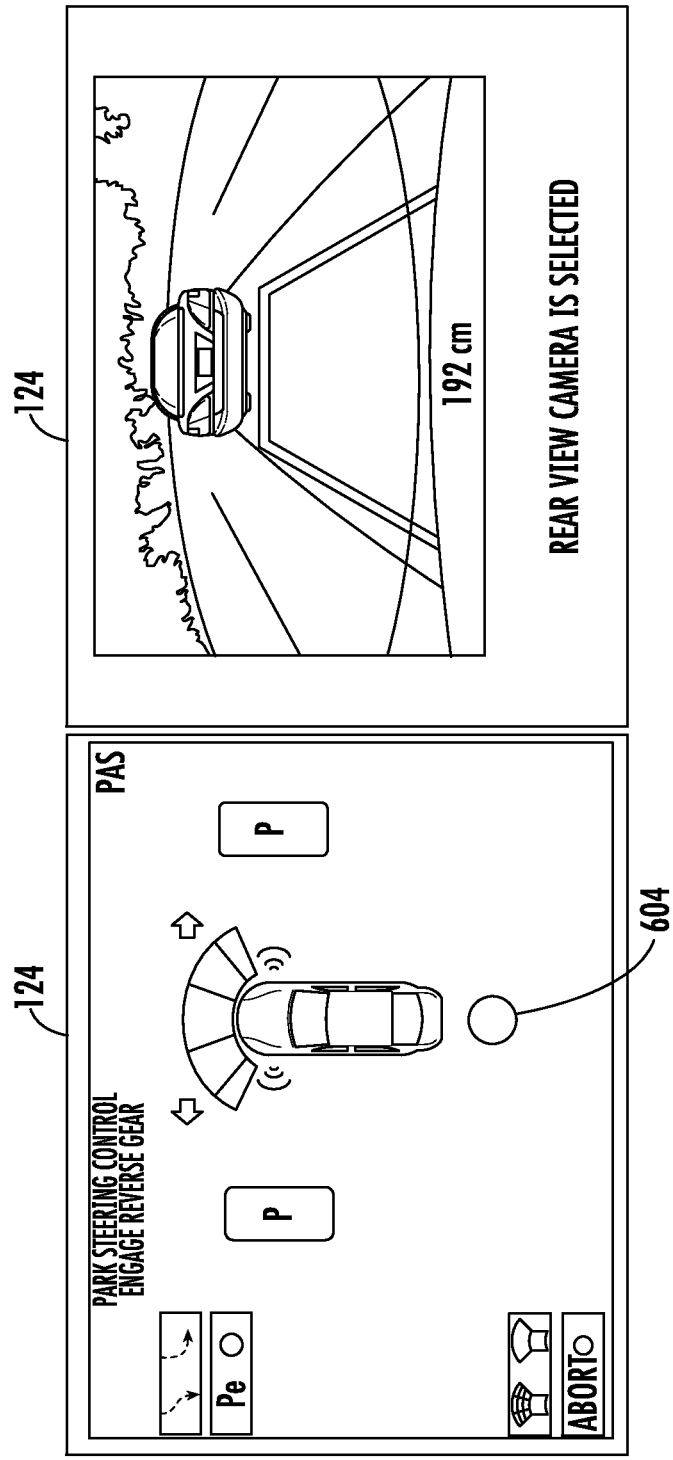

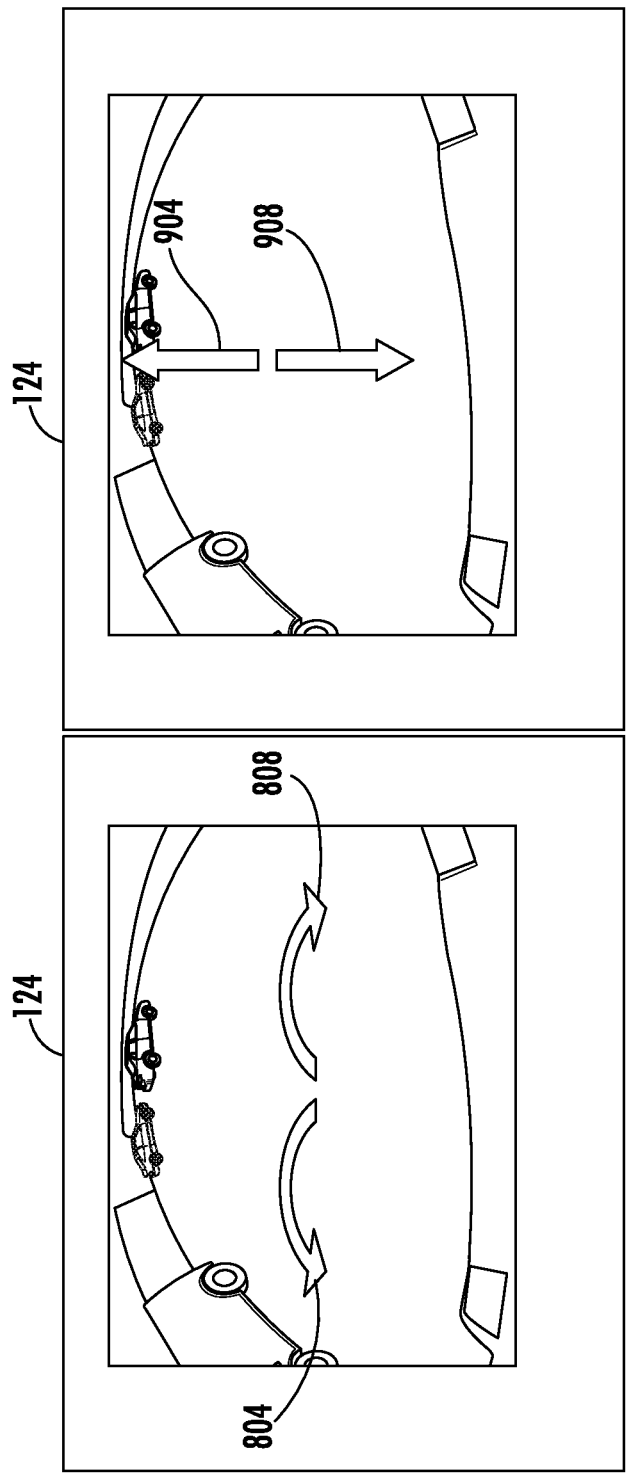

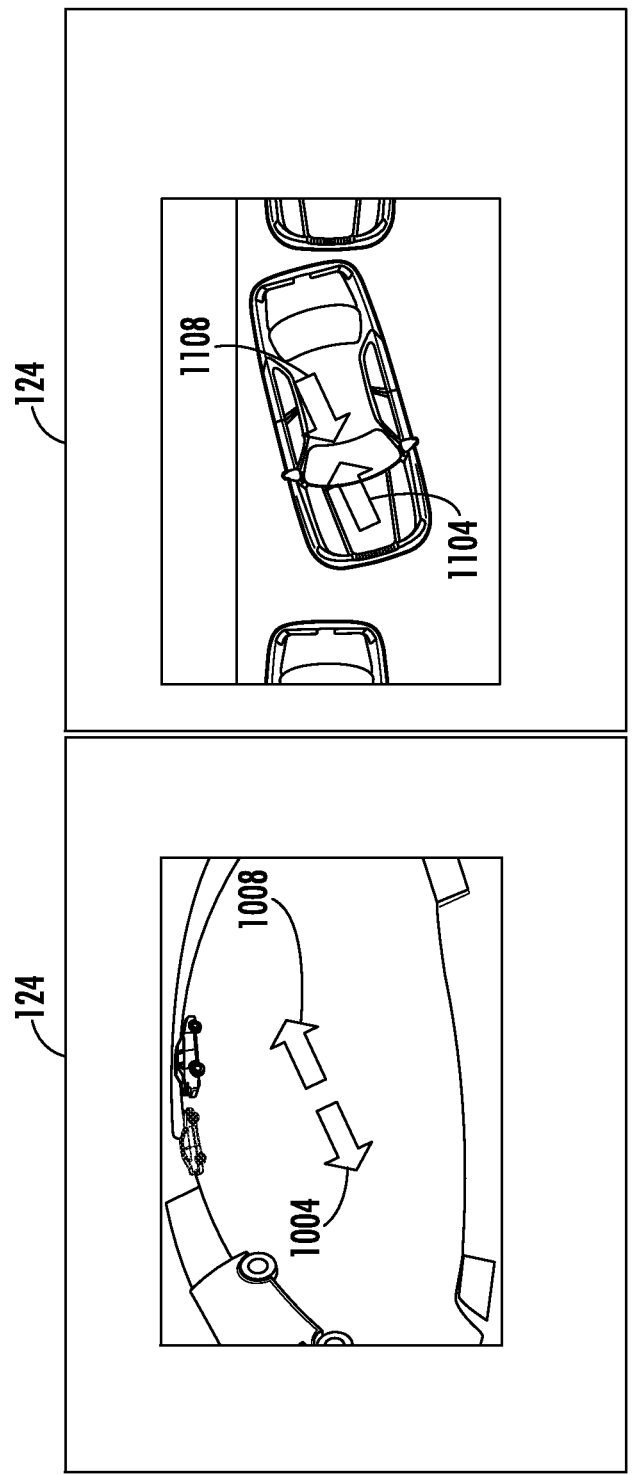

SYSTEM AND METHOD FOR USING GESTURES IN AUTONOMOUS PARKING

CLAIM OF PRIORITY

This application claims priority to U.S. Provisional Application No. 61/720,186, which is entitled "System And Method For Using Gestures In Autonomous Parking," and was filed on Oct. 30, 2012.

FIELD

This disclosure relates generally to the field of automated assistance and, more specifically, to systems and methods that enable a vehicle to park in an autonomous or semi-autonomous manner.

BACKGROUND

Modern motor vehicles often include one or more in-vehicle information systems that provide a wide variety of information and entertainment options to occupants in the vehicle. Common services that are provided by the in-vehicle information systems include, but are not limited to, vehicle state and diagnostic information, navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touchscreen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

Some motor vehicles also have autonomous or semi-autonomous parking systems. An autonomous parking system can operate the vehicle under a predetermined set of circumstances to park the vehicle without human intervention. In some semi-autonomous parking systems, the human operator still controls all or a portion of the parking procedure manually, but receives additional assistance from cameras or other sensors that are integrated with the vehicle.

While autonomous and semi-autonomous parking systems are known to the art, such systems can present complex user interfaces that are not well understood by a large number of drivers. Additionally, while many vehicles include navigation systems and other information services, such systems are not integrated with autonomous parking systems. Consequently, improved systems and methods for vehicle information systems that enable the operator to find available parking spaces and park the vehicle in an efficient manner would be beneficial.

SUMMARY

An in-vehicle information system enables a vehicle operator to find parking spaces and assists in parking the vehicle. The in-vehicle information system accepts voice and gesture input to find parking garages or parking lots, and also find available parking spaces in a parking garage or parking lot. The system further accepts gesture input to select a specific parking space and to specify a mode for parking the vehicle. The operator of the vehicle can operate one or more cameras and sensors using voice commands and gesture input to assist the operator in parking the vehicle.

BRIEF DESCRIPTION OF THE DRAWINGS

FIG. 1 is a schematic view of components of an in-vehicle information system in a passenger compartment of a vehicle.

FIG. 2 is a display depicting a motor vehicle and a gesture for selecting a region around the motor vehicle including one or more parking spaces.

FIG. 3 is another display depicting a motor vehicle and a gesture for selecting a region around the motor vehicle including one or more parking spaces.

FIG. 4 is a display depicting a gesture used to select a parking space near a vehicle for parking the vehicle.

FIG. 5 is another display depicting a gesture used to select a parking space near a vehicle for parking the vehicle.

FIG. 6 is a display depicting a gesture that is used to activate a camera in a vehicle to assist in parking.

FIG. 7 is a photograph taken through a rear-view camera in the vehicle.

FIG. 8 is a display of a camera in the vehicle and gestures that enable an operator of the vehicle to control a pan of the camera.

FIG. 9 is a display of a camera in the vehicle and gestures that enable an operator of the vehicle to control a tilt of the camera.

FIG. 10 is a display of a camera in the vehicle and gestures that enable an operator of the vehicle to control a zoom of the camera.

FIG. 11 is a display of a camera in that is external to the vehicle and accessed in the vehicle through a wireless data connection and gestures that enable an operator of the vehicle to control a zoom of the camera.

DETAILED DESCRIPTION

Figure 12:
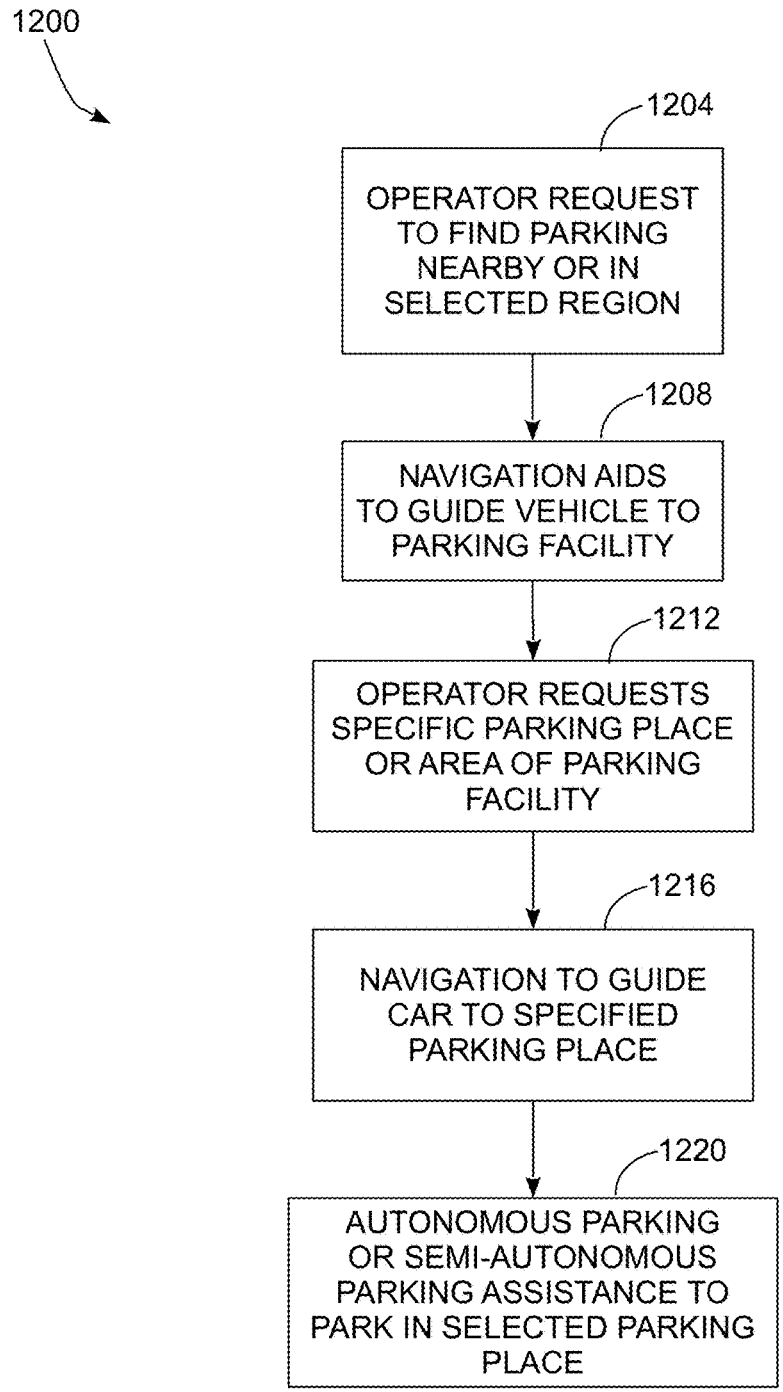
FIG. 12 is a block diagram of a process for navigating to a selected parking area and parking in a selected parking space.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains. Described herein is an in-vehicle information system 100 that integrates multiple input and output devices. The in-vehicle information system 100 includes the components described below in conjunction with the FIG. 1.

As used herein, the term "gesture" includes any movement by a human operator that corresponds to an input for control of a computing device, including an in-vehicle parking assistance service. While not a requirement, many gestures are performed with the hands and arms. Examples of gestures include pressing one or more fingers on a surface of a touch sensor, moving one or more fingers across a touch sensor, or moving fingers, hands, or arms in a three-dimensional motion that is captured by one or more cameras or three-dimensional sensors. Other gestures include head movement or eye movements. As used herein, the term "gesture input device" refers to any device that is configured to sense gestures of a human operator and to generate corresponding data that a digital processor or controller interprets as input to control the operation of software programs and hardware components, particularly hardware components in a vehicle. Many gesture input devices include touch-sensitive devices including surface with resistive and capacitive touch sensors. A touchscreen is a video output devices that includes an integrated touch sensor for touch inputs. Other gesture input devices include cameras and other remote sensors that sense the movement of the operator in a three-dimensional space or sense movement of the operator in contact with a surface that is not otherwise equipped with a touch sensor. Embodiments of gesture input devices that are used in a vehicle are described below.

In FIG. 1, an in-vehicle information system 100 includes a head-up display (HUD) 120, one or more console LCD panels 124, one or more input microphones 128, one or more output speakers 132, input reference regions 134A, 134B, and 136 over a steering wheel 104, input regions 140 and 141 on nearby armrest areas 112 and 113 for one or both of left and right arms, respectively, and a motion sensing camera 144. In the system 100, the HUD 120 and LCD panels 124 are illustrative embodiments of video output devices. The microphones 128, and speakers 132 are illustrative embodiments of audio input and output devices, respectively. The motion sensing camera 144 and touchscreen input device in the LCD display 124 are illustrative embodiments of gesture input devices, where the sensing camera 144 captures gestures in three-dimensions or in the input regions 134A, 134B, 136, 140, and 141. In alternative embodiments, one or more surfaces in the vehicle are configured to use touch sensors to receive input gestures.

In the system 100, a controller 148 is operatively connected to each of the components in the in-vehicle information system 100. The controller 148 includes one or more integrated circuits configured as a central processing unit (CPU), microcontroller, field programmable gate array (FPGA), application specific integrated circuit (ASIC), digital signal processor (DSP), or any other suitable digital logic device. The controller 148 also includes a memory, such as a solid state or magnetic data storage device, that stores programmed instructions that are executed by the controller 148 for operation of the in-vehicle information system 100. In some embodiments, the controller 148 connects to or incorporates additional components, such as a global positioning system (GPS) receiver 152 and wireless network device 154, to provide navigation and communication with external data networks and computing devices. The in-vehicle information system 100 is integrated with conventional components that are commonly found in motor vehicles including a windshield 102, dashboard 108, armrests 112 and 113, and the steering wheel 104.

In the system 100, the input regions 134A, 134B, 136, and 140 provide a surface for a vehicle operator to enter input data using hand motions or input gestures. In one embodiment, the input regions include gesture sensor devices, such as infrared or Time of Flight (TOF) sensors, which identify input gestures from the operator. In another embodiment, the camera 144 is mounted on the roof of the passenger compartment and views one or more of the gesture input regions 134A, 134B, 136, 140, and 141. In addition to input gestures that are made while the operator is in contact with a surface in the vehicle, the camera 144 records hand, arm, and head movement in a region around the driver, such as the region above the steering wheel 104. The LCD panel 124 also includes a touch sensor, such as a resistive or capacitive touchscreen sensor, and the vehicle operator enters touch input and gestures through direct contact with the touchscreen LCD panel 124.

On the steering wheel 104, the touch input regions 134A and 134B are located on the circumference of the steering wheel 104, where a vehicle operator commonly places his or her hands during operation of the vehicle. In some circumstances the operator also contacts the touch input region 136 to activate, for example, a horn in the vehicle. Additionally, the operator may place an arm on the armrest 112. The controller 148 is configured to ignore touch inputs received from the touch regions except when the vehicle operator is prompted to enter input data using the touch interface to prevent spurious inputs from the touch regions.

In some embodiments, the controller 148 is configured to identify written or typed input that is received from one of the touch interface regions in addition to identifying simple gestures entered through the touch regions. For example, the operator engages the touch regions 136 or 140 with a finger to write characters or numbers. In another embodiment, the controller 148 displays a simplified virtual keyboard using the HUD 120 and the operator selects keys using the touch input regions 136 or 140 while maintaining eye contact with the environment around the vehicle through the windshield 102.

The microphone 128 generates audio data from spoken input received from the vehicle operator or another vehicle passenger. The controller 148 includes hardware, such as DSPs, which process the audio data, and software components, such as speech recognition software, to identify voice commands. Additionally, the controller 148 includes hardware and software components that enable generation of synthesized speech output through the speakers 132 to provide aural feedback to the vehicle operator and passengers.

In the embodiment of FIG. 1, the controller 148 is operatively connected to one or more cameras and sensors 158 that are placed at different locations in the vehicle. The cameras and sensors are configured to provide additional information to the vehicle operator or to an autonomous parking system to assist in parking the vehicle. For example, many vehicles include rear-facing "backup" cameras that provide a better view of the region immediately behind the vehicle when the vehicle is moving in reverse. Some vehicles include other cameras that cover other regions around the vehicle as well. Sensors include laser-range finding sensors, ultrasonic range finding devices, or radar devices that can identify a distance, and optionally a bearing, between the vehicle and other objects in the vicinity of the vehicle so that the vehicle can stop prior to colliding with the objects while parking.

The in-vehicle information system 100 provides visual feedback to the vehicle operator using the LCD panel 124, the HUD 120 that is projected onto the windshield 102, and through gauges, indicator lights, or additional LCD panels that are located in the dashboard 108. When the vehicle is in motion, the controller 148 optionally deactivates the LCD panel 124 or only displays a simplified output through the LCD panel 124 to reduce distraction to the vehicle operator. The controller 148 displays visual feedback using the HUD 120 to enable the operator to view the environment around the vehicle while receiving visual feedback. The controller 148 typically displays simplified data on the HUD 120 in a region corresponding to the peripheral vision of the vehicle operator to ensure that the vehicle operator has an unobstructed view of the road and environment around the vehicle.

As described above, the HUD 120 displays visual information on a portion of the windshield 120. As used herein, the term "HUD" refers generically to a wide range of head-up display devices including, but not limited to, combined head up displays (CHUDs) that include a separate combiner element, and the like. In some embodiments, the HUD 120 displays monochromatic text and graphics, while other HUD embodiments include multi-color displays. While the HUD 120 is depicted as displaying on the windshield 102, in alternative embodiments a head up unit is integrated with glasses, a helmet visor, or a reticle that the operator wears during operation. As described below, either or both of the HUD 120 and the LCD display 124 display graphics and video data that assist the vehicle operator in finding a parking space and in parking the vehicle.

In some operating modes, the in-vehicle information system 100 operates independently, while in other operating modes, the in-vehicle information system 100 interacts with a mobile electronic device, such as a smartphone 170, tablet, notebook computer, or other electronic device. The in-vehicle information system communicates with the smartphone 170 using a wired interface, such as USB, or a wireless interface such as Bluetooth. The in-vehicle information system 100 provides a user interface that enables the operator to control the smartphone 170 or another mobile electronic communication device with reduced distraction. For example, the in-vehicle information system 100 provides a combined voice and gesture based interface to enable the vehicle operator to make phone calls or send text messages with the smartphone 170 without requiring the operator to hold or look at the smartphone 170. In some embodiments, the smartphone 170 includes various devices such as GPS and wireless networking devices that complement or replace the functionality of devices that housed in the vehicle.

In one embodiment, the vehicle operator holds the smartphone 170 and stands outside of the vehicle to activate an autonomous parking system. For example, in some parking lots the parking spaces are too narrow for the operator to enter and exit the vehicle while the vehicle is in a parking space. The operator executes the parking assistance software using the smartphone that communicates with the in-vehicle information system 100 using the wireless network device 154. The vehicle moves into and out of the parking space autonomously while the operator is outside of the passenger compartment in the vehicle.

During operation, the operator of the vehicle activates a parking assistance service that is implemented as stored program instructions that the controller 148 executes to park the vehicle. In an autonomous parking system, the controller 148 is additionally connected to various systems in the vehicle such as, for example, the transmission, power-steering, engine, and brakes to control the movement of the vehicle during the parking process. As used herein, the term "parking assistance service" refers to hardware and software components in the vehicle that assist the driver in parking the vehicle in a selected parking space. Parking assistance services include both autonomous and semi-autonomous parking assistance services. In a fully autonomous parking assistance service, an automated system in the vehicle takes control of the steering, throttle, brakes, and other components in the vehicle that are required to park the vehicle without operator control. In a semi-autonomous parking assistance service, the operator retains either full control or partial control of the vehicle while the parking assistance service provides information to assist the operator in parking the vehicle. For example, in one embodiment a semi-autonomous parking assistance service controls the steering of the vehicle while the operator retains control of the throttle and brakes. In another semi-autonomous parking assistance service, the operator retains control of the vehicle and the parking assistance service displays video from cameras with optional sensor data to provide additional information about the environment around the vehicle to the operator during the parking process. In one configuration, the parking assistance service is activated through a voice command that the controller 148 receives through the microphone 128. In another configuration, the parking assistance service is activated through one or more input gestures that specify an available parking space that the operator selects to park the vehicle. The parking assistance service provides navigational aids to enable the vehicle operator to move the vehicle into a selected area of a parking lot or parking garage, to find an individual available parking space, and to park the vehicle in the parking space.

Upon activation, the controller 148 displays a graphical interface including an icon that represents the vehicle and regions including parking spaces around the vehicle. As depicted in FIG. 2, the display 124 depicts the vehicle 202 and the operator uses the touch-interface to input a gesture in the form an elliptical region around the vehicle that includes one or more parking spaces, such as parking lot regions 208 and 212. FIG. 3 depicts an alternative display where the operator inputs another gesture in the form of a rectangular region 304 around one or more parking spaces. In one embodiment, the controller 148 identifies available parking spaces around the vehicle using the sensors 158. In another embodiment, the controller 148 interfaces with an external parking system that is implemented in, for example, a parking lot or parking garage, through the wireless network device 154. The controller 148 receives data corresponding to the locations of available parking spaces and displays the relative locations of the parking spaces around the vehicle given a location of the vehicle that is identified from data received from the GPS 152.

After identifying regions that include multiple parking spaces, the in-vehicle information system 100 directs the vehicle operator to a selected region using, for example, audio and visual navigation aids. After the vehicle is driven into a parking area with available spaces, the operator is prompted to select an individual available parking space. FIG. 4 depicts another display with an individual parking space 408 that is selected using an elliptical gesture 424, which the operator enters through the touchscreen 124. In another embodiment, the operator places a finger in contact with the touchscreen 124 over the vehicle icon 404 and drags the vehicle icon onto a selected parking space. For example, in FIG. 4 the operator touches the car icon 404 and moves his or her finger in direction 414 to drag the vehicle icon 404 onto the parking space 408. The operator removes the finger from the touchscreen to "drop" the car icon 404 in the parking space 408, which indicates that the operator has selected the parking space for parking the vehicle.

In another embodiment depicted in FIG. 4, the operator not only selects a parking space, but also inputs a gesture that specifies how the vehicle should be parked in the space. In FIG. 4, the vertical gesture 428 indicates that the vehicle should enter the parking space in a perpendicular parking mode (e.g. pulling into the parking space or backing into the parking space). In FIG. 5, the operator selects a parking space 508 using a tap gesture 524. In an alternative embodiment of FIG. 5, the operator inputs a horizontal line gesture 528 to indicate that the vehicle should park in a parallel parking mode.

Once an available parking space is selected, the vehicle parks in the space. In vehicles that include a fully autonomous parking capability, the controller 148 and associated systems in the vehicle move the vehicle into the selected parking space. The in-vehicle information system 100 activates the autonomous parking system once the vehicle is positioned proximate to the selected parking space. If the vehicle is out of position, then the vehicle operator is prompted to move the vehicle to a predetermined location where the autonomous parking system performs the parking procedure. For example, the LCD panel 124 or HUD 120 displays the current location of the vehicle and a target location where the vehicle should be located to activate the autonomous parking system.

In a semi-autonomous system, the in-vehicle information system 100 presents additional data to the vehicle operator to assist in parking the vehicle in the selected parking space. In the system 100, the vehicle includes the cameras and other sensors 158. The controller 148 identifies the direction towards a selected parking space using either direct data from the sensors 158 or using location information corresponding to the parking space in a parking facility and the current location of the vehicle using location data from the GPS 152. The controller 148 optionally activates one of the cameras 158 that has a view of the parking space and displays the video on the HUD 120 or LCD 124. In an embodiment where the cameras 158 are configured to pan, tilt, and zoom, the controller 148 pans, tilts, and zooms the camera to provide a clear view of the parking space. As described below, the controller 148 optionally includes sensor information, such as distance between the vehicle and an object near the parking space, to assist the operator in parking the vehicle.

In addition to an optional automatic camera tracking process, the vehicle operator selects one or more cameras 158 in the vehicle to assist in parking the vehicle using voice commands that the controller 148 receives through the microphone 128. For example, the operator utters spoken commands "REAR CAMERA," "DRIVER SIDE CAMERA," PASSENGER SIDE CAMERA," or "ROOF CAMERA" to view images from the corresponding cameras on the touchscreen 124 or the HUD 120. In another embodiment, the operator manually selects a section of the vehicle or an icon on the touchscreen 124 to activate a selected camera. In another embodiment, the operator enters a touch gesture corresponding to a region around the vehicle and the controller 148 selects an appropriate camera based on the gesture. For example, in FIG. 6 the operator circles a region 604 behind the vehicle, and the controller 148 displays images from a rear-view camera and range-finding sensors on the LCD 124, as depicted in FIG. 7. In another embodiment, the operator enters a predetermined gesture to activate different cameras on, for example, the front, sides, rear, or top of the vehicle. In one embodiment a "∩" or "∪" shaped gesture in the front or the rear, respectively, of the graphical representation of the vehicle selects a front facing camera or rear facing camera, respectively. A linear gesture that extends right or left through the graphical depiction of the vehicle selects a right-side or left-side camera, respectively.

In some embodiments, cameras that assist in parking the vehicle include adjustable pan, tilt, and zoom features to provide the operator with a clear view of the area around the vehicle. The in-vehicle information system 100 enables the operator to adjust the cameras using gestures during the parking process. In FIG. 8, the operator pans a camera left and right using the horizontal arc-shaped gesture 804 and 808, respectively. In another embodiment, the operator pans the camera using horizontal linear gestures. In FIG. 9, the operator tilts a camera up and down using the vertical linear gestures 904 and 908, respectively.

In some embodiments, the controller 148 is operatively connected to multiple cameras in the vehicle or in a region around the vehicle. The controller 148 automatically switches the camera that displays images on the LCD 124 or HUD 120 when the operator pans or tilts the view a sufficient distance to move the field of view to a different camera. Each camera in the vehicle has a predetermined field of view, and the controller 148 is configured to select a different camera for the display of video output when input from the operator to pan or tilt a camera includes a region around the vehicle that is outside the field of view for the presently selected camera. For example, if the operator pans the rear-view camera display in FIG. 8 by a 90° angle toward the passenger side, then the controller 148 displays a camera view from a passenger side camera instead of the rear view camera.

In some embodiments, a camera in the vehicle or the region around the vehicle can zoom in or out. The in-vehicle information system 100 enables the operator to control the zoom of the camera using touch input gestures. In FIG. 10, the operator increases the level of zoom by placing two fingers on the touchscreen 124 and pulling the fingers apart in directions 1004 and 1008. The operator decreases the level of zoom by pinching two fingers together in the opposite directions.

In another embodiment, the controller 148 interfaces with an external camera using the wireless network device 154. For example, in one embodiment a camera is mounted on a streetlamp or other post above a parking space. The controller 148 communicates with the external camera and displays a view of the vehicle and the parking space, as depicted in FIG. 11. The vehicle operator zooms the view of the parking space and vehicle using the touch gestures, such as pinching touch gestures 1104 and 1108, to reduce the level of zoom on the scene around the vehicle. In addition to receiving images from an external camera, some vehicle embodiments include one or more roof-mounted cameras that generate the top-down view of the vehicle and the area around the vehicle as depicted in FIG. 11. The controller 148 in the in-vehicle information system 100 generates a composite image of the top of the vehicle from multiple images that are generated by a moving camera or by multiple cameras on the roof of the vehicle.

The in-vehicle information system 100 enables more efficient parking by enabling the vehicle operator to find available parking spaces in an efficient manner and by assisting the vehicle operator in parking the vehicle in an available space. In some embodiments, the controller 148 communicates with external parking lot information systems to enable the operator of the vehicle to pay for parking using the touchscreen 124 or HUD 120.

FIG. 12 depicts a process 1200 for interacting with an in-vehicle information system, such as the system 100 of FIG. 1, to assist in navigating to a parking area and for parking the vehicle in a parking space. In the description below, a reference to the process 1200 performing a function or action refers to a processor, such as one or more processors in the controller 148 or the mobile electronic device 170, executing programmed instructions to operate one or more components to perform the function or action.

Process 1200 begins when a vehicle operator generates a request to find a parking lot or parking garage while driving the vehicle (block 1204). In one embodiment, the vehicle operator enters gestures to, for example, outline an area in a map that is displayed on the HUD 120 or LCD panel 124 to instruct the in-vehicle information system 100 to locate available parking lots or parking garages in a geographical area. In another embodiment, the operator provides a spoken request through the microphone 132, such as "Find nearby parking," and the controller 148 identifies nearby parking facilities. The operator can specify a geographic area on a map using gesture input to narrow the search for suitable parking facilities.

After selecting a parking facility, the in-vehicle information system 100 provides navigation aids to reach the parking facility (block 1208). For example, the in-vehicle information system 100 identifies the location of the vehicle with reference to data received through the GPS 152. The controller 148 executes a navigation program to provide audiovisual indicators to the vehicle operator to guide the vehicle to the selected parking facility. The HUD 120 or LCD panel 124 uses the identified position of the vehicle from the GPS 152 to generate a graphical depiction of the vehicle on the map in relation to parking spaces in the parking facility. The navigation system enables "last mile" parking assistance to assist the vehicle operator in finding a parking facility in a selected area. Some parking facilities include control systems that report the status of available parking spaces, and the in-vehicle information system 100 is configured to communicate with the parking facilities through a wireless data network to verify the availability of parking spaces before guiding the vehicle to the parking facility.

Once the vehicle reaches the parking facility, the operator requests assistance in finding a region of the parking facility in which to park the vehicle (block 1212). For example, some parking facilities are multi-level parking garages with elevators that connect different floors of the garage. The vehicle operator can enter a spoken request to "Find parking spaces near an elevator." In another embodiment, the vehicle operator views a map of the parking facility using the HUD 120 or LCD panel 124, and the operator enters a gesture such as an ellipse or rectangle around a region of the parking garage that is near the elevators.

After receiving the request, the in-vehicle information system 100 provides additional navigation aids to guide the vehicle to the selected region of the parking facility (block 1216). In some embodiments, the parking facility includes sensors that identify available parking spaces and a control system in the parking facility sends data about the layout of the parking facility and locations of the parking spaces to the controller 148 through the wireless network device 154. The controller 148 then provides audiovisual turn-by-turn navigation aids to the vehicle operator to guide the vehicle to the selected region of the parking facility in an efficient manner.

Once the vehicle reaches the selected region of the parking garage, the in-vehicle information system 100 prompts the operator to engage an autonomous parking system or to select a parking space for semi-autonomous parking (block 1220). In one embodiment where the vehicle includes an autonomous parking system, the vehicle operator simply instructs the vehicle to park in an available parking space through a spoken command or gesture input. In another embodiment, the vehicle operator selects a specific parking space and a specific parking mode (e.g. parallel or perpendicular parking) using gesture input as described above with reference to FIG. 4 and FIG. 5. In vehicles that include semi-autonomous parking assistance aids such as parking cameras, the in-vehicle information system activates the cameras and accepts commands from the vehicle operator to adjust the cameras while the operator parks the vehicle in the selected parking space.

It will be appreciated that variants of the above-disclosed and other features and functions, or alternatives thereof, may be desirably combined into many other different systems, applications or methods. For example, while FIG. 2-FIG. 11 depict visual displays on the LCD panel 124, the HUD 120 displays the same visual data and the vehicle operator enters touch gestures through the touch input devices 134A-134B, 136, or 140 in an alternative embodiment. Various presently unforeseen or unanticipated alternatives, modifications, variations or improvements may be subsequently made by those skilled in the art that are also intended to be encompassed by the following claims.

What is claimed:

1. A method of providing parking assistance in a vehicle comprising:
    identifying with a controller in a vehicle a plurality of available parking spaces for the vehicle;
    generating with a video output device operatively connected to the controller an interface with a graphical depiction of the vehicle and the plurality of available parking spaces;
    receiving a first input gesture with a gesture input device to select one parking space from the plurality of available parking spaces;
    receiving a second input gesture with the gesture input device corresponding to one of a first linear input gesture in a first direction or a second linear input gesture in a second direction in a location corresponding to the one parking space on the video output device;
    operating with the controller an autonomous parking system in the vehicle to move the vehicle into the one parking space in a parallel parking mode in response to the second input gesture being the first linear input gesture; and
    operating with the controller the autonomous parking system in the vehicle to move the vehicle into the one parking space in a perpendicular parking mode in response to the second input gesture being the second linear input gesture.

2. The method of claim 1, the generating of the graphical depiction of the vehicle and the plurality of available parking spaces further comprising:
    selecting with the controller at least one camera that views the one parking space; and
    generating a video output from the selected camera depicting the one parking space.

3. The method of claim 1 further comprising:
    receiving speech input with an audio input device operatively connected to the controller to select one camera from a plurality of cameras in the vehicle; and
    generating a video output from the one camera depicting the one parking space.

4. The method of claim 1, the generating of the graphical depiction of the vehicle and the plurality of available parking spaces further comprising:
    receiving a third input gesture with the gesture input device to select a first camera from a plurality of cameras in the vehicle; and
    generating a video output from the first camera depicting the one parking space.

5. The method of claim 4 further comprising:
    identifying with a range finding sensor in the vehicle a range between the vehicle and an object proximate to the one parking space; and
    generating a graphical indicator corresponding to the identified range with the video output from the first camera.

6. The method of claim 4 further comprising:
receiving a fourth input gesture with the gesture input device during generation of the video output from the first camera; and
adjusting at least one of a pan, tilt, and zoom of the first camera in response to the fourth input gesture.

7. The method of claim 6 further comprising:
identifying with the controller the fourth input gesture corresponding to a request for a pan or a tilt of the first camera to a region around the vehicle outside of a predetermined field of view for the first camera;
selecting with the controller a second camera in the plurality of cameras in the vehicle with a predetermined field of view that includes the region around the vehicle; and
generating the video output from the second camera.

8. The method of claim 1, the operation of the autonomous parking system further comprising:
operating with the controller the autonomous parking system in the vehicle to move the vehicle into the one parking space in the parallel parking mode in response to the first linear input gesture being a linear input gesture that is horizontal with respect to a surface of the gesture input device; and
operating with the controller the autonomous parking system in the vehicle to move the vehicle in the perpendicular parking mode in response to the second linear input gesture being a linear input gesture that is vertical with respect to the surface of the gesture input device.

9. The method of claim 1, the identification of the plurality of available parking spaces further comprising:
receiving with a wireless network device in the vehicle data corresponding to a map of a parking facility that includes the plurality of available parking spaces;
identifying with a global positioning system (GPS) device in the vehicle a location of the vehicle in relation to the map of the parking facility; and
generating with the video output device a graphical depiction of the map including the plurality of available parking spaces and the vehicle in the map with reference to the identified location of the vehicle.

10. A system for providing parking assistance in a vehicle comprising:
a video output device configured to generate a graphical display for an operator in the vehicle;
a gesture input device configured to receive input gestures from the operator;
an autonomous parking system; and
a controller, the controller being operatively connected to the video output device, the gesture input device, and the autonomous parking system and the controller being configured to:
identify a plurality of available parking spaces for the vehicle;
generate with the video output device an interface with a graphical depiction of the vehicle and the plurality of available parking spaces;
receive a first input gesture with a gesture input device to select one parking space from the plurality of available parking spaces;
receive a second input gesture corresponding to one of a first linear input gesture in a first direction or a second linear input gesture in a second direction in a location corresponding to the one parking space on the video output device;
operate the autonomous parking system in the vehicle to move the vehicle into the one parking space in a parallel parking mode in response to the second input gesture being the first linear input gesture; and
operate the autonomous parking system in the vehicle to move the vehicle into the one parking space in a perpendicular parking mode in response to the second input gesture being the second linear input gesture.

11. The system of claim 10 further comprising:
a plurality of cameras in the vehicle; and
the controller being operatively connected to the plurality of cameras and further configured to:
select one camera that views the one parking space from the plurality of cameras in the vehicle; and
generate a video output from the one camera with the video output device to depict the one parking space.

12. The system of claim 10 further comprising:
an audio input device in the vehicle;
a plurality of cameras in the vehicle; and
the controller being operatively connected to the audio input device and the plurality of cameras and further configured to:
receive speech input with audio input device to select one camera that views the one parking space from a plurality of cameras in the vehicle; and
generate a video output from the one camera to depict the one parking space.

13. The system of claim 10 further comprising:
a plurality of cameras in the vehicle; and
the controller being operatively connected to the plurality of cameras and further configured to:
receive a third input gesture with the gesture input device to select a first camera from the plurality of cameras; and
generate a video output from the first camera with the video output device to depict the one parking space.

14. The system of claim 13 further comprising:
a range finding sensor in the vehicle; and
the controller being operatively connected to the range finding sensor and further configured to:
identify a range between the vehicle and an object that is proximate to the one parking space with the range finding sensor; and
generate a graphical indicator corresponding to the identified range with the video output from the first camera on the video output device.

15. The system of claim 13, the controller being further configured to:
receive a fourth input gesture with the gesture input device during generation of the video output from the first camera; and
adjust at least one of a pan, tilt, and zoom of the first camera in response to the fourth input gesture.

16. The system of claim 15, the controller being further configured to:
identify the fourth input gesture corresponding to a request for a pan or a tilt of the first camera to a region around the vehicle outside of a predetermined field of view for the first camera;
select a second camera in the plurality of cameras in the vehicle with a predetermined field of view that includes the region around the vehicle; and
generate the video output from the second camera with the video output device.

17. The system of claim 10, the controller being further configured to:

operate the autonomous parking system in the vehicle to move the vehicle into the one parking space in the parallel parking mode in response to the first linear input gesture being a linear input gesture that is horizontal with respect to a surface of the gesture input device; and operate the autonomous parking system in the vehicle to move the vehicle into the one parking space vehicle in the perpendicular parking mode in response to the second linear input gesture being a linear input gesture that is vertical with respect to a surface of the gesture input device.

18. The system of claim 10 further comprising;

a wireless network device in the vehicle;

a global positioning system (GPS) device in the vehicle; and the controller being operatively connected to the wireless network device and the GPS device, the controller being further configured to:

receive data corresponding to a map of a parking facility that includes the plurality of available parking spaces with the wireless network device;

identify a location of the vehicle in relation to the map of the parking facility with the GPS; and generate a graphical depiction of the map including the plurality of available parking spaces and the vehicle in the map with reference to the identified location of the vehicle with the video output device.

* * * * *